US008483132B2

(12) United States Patent
Venkatachalam et al.

(10) Patent No.: US 8,483,132 B2
(45) Date of Patent: Jul. 9, 2013

(54) APPARATUS AND METHODS FOR UPGRADING AN AIRLINK IN A WIRELESS SYSTEM

(75) Inventors: Muthaiah Venkatachalam, Beaverton, OR (US); Xiangying Yang, Portland, OR (US); Avishay Sharaga, Bet Nehemya (IL); Shantidev Mohanty, Santa Clara, CA (US); Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 12/890,179

(22) Filed: Sep. 24, 2010

(65) Prior Publication Data

US 2011/0134896 A1 Jun. 9, 2011

Related U.S. Application Data

(60) Provisional application No. 61/266,887, filed on Dec. 4, 2009.

(51) Int. Cl.
*H04W 4/00* (2009.01)

(52) U.S. Cl.
USPC .......................................................... 370/328

(58) Field of Classification Search
None
See application file for complete search history.

(56) References Cited

U.S. PATENT DOCUMENTS

| 2008/0049674 | A1* | 2/2008 | Cha et al. ........................ 370/331 |
| 2009/0196424 | A1* | 8/2009 | Germaneau et al. .......... 380/277 |
| 2010/0098025 | A1* | 4/2010 | Chen et al. ..................... 370/331 |
| 2010/0103896 | A1* | 4/2010 | Cho et al. ....................... 370/329 |
| 2010/0260142 | A1* | 10/2010 | Jung et al. ..................... 370/331 |

FOREIGN PATENT DOCUMENTS

| EP | 2144464 A2 | 1/2010 |
| EP | 2164288 A2 | 3/2010 |
| WO | 2009/094093 A2 | 7/2009 |
| WO | 2010/045877 A1 | 4/2010 |
| WO | 2010/107281 A2 | 9/2010 |
| WO | 2011/002241 A2 | 1/2011 |

OTHER PUBLICATIONS

Search Report received for United kingdom Patent Application No. GB1020376.8, mailed on Mar. 25, 2011, 4 pages.
Office Action received for Germany Patent Application No. 10 2010 052 539.1, mailed on Aug. 11, 2011, 7 pages of German office action and 8 pages of English translation.
Papapanagiotou et al., "A Survey on Next Generation Mobile WiMAX Networks: Objectives, Features and Technical Challenges", IEEE Communications Surveys & Tutorials, vol. 11, Issue No. 4, 2009, pp. 3-18.
IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std 802.16e™ -2005, Feb. 28, 2006, 24 pages.
"Draft Amendment to IEEE Standard for Local and metropolitan area networks—Part 16: Air Interface for Broadband Wireless Access Systems—Advanced Air Interface", IEEE P802.16m/D7, Jul. 29, 2010, 31 pages.

* cited by examiner

*Primary Examiner* — Yong Zhou
(74) *Attorney, Agent, or Firm* — Kacvinsky Daisak PLLC (57) ABSTRACT

Embodiments of systems and methods for upgrading an airlink in wireless system are described herein. Other embodiments may be described and claimed.

20 Claims, 4 Drawing Sheets

APPARATUS AND METHODS FOR UPGRADING AN AIRLINK IN A WIRELESS SYSTEM

CLAIM OF PRIORITY

The present application claims priority to U.S. Patent Application No. 61/266,887 filed Dec. 4, 2009, the entire disclosure of which is hereby incorporated by reference in its entirety.

FIELD OF THE INVENTION

This application relates to wireless systems and, more particularly, to providing methods for upgrading an airlink in a wireless system or network.

BACKGROUND

A wireless communications system typically has base stations, nodes, or other stations distributed throughout an area to provide connectivity throughout the area. Each base station connects through a communications infrastructure to a communications backbone to connect to other subscribers and to users and systems outside the wireless system.

Operators of wireless communication systems deploy the base stations to provide the airlink or air interface for users of the wireless communication system. The air interface may be changed, upgraded, or otherwise replaced to accommodate new hardware, software, and methods for communicating over the wireless communications system.

BRIEF DESCRIPTION OF THE DRAWINGS

The present invention is illustrated by way of example and not as a limitation in the figures of the accompanying drawings, in which.

DETAILED DESCRIPTION

In the following detailed description, numerous specific details are set forth in order to provide a thorough understanding of embodiments of the invention. However it will be understood by those skilled in the art that embodiments of the invention may be practiced without these specific details. In other instances, well-known methods, procedures, components and circuits have not been described in detail so as not to obscure embodiments of the invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system which may comprise a processor, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

The following detailed description also describes various embodiments for accessing a wireless network by a wireless device, platform, user equipment (UE), subscriber station (SS), station, mobile station (MS) or advanced mobile station (AMS). The various forms of devices such as the platform, UE, SS, MS, or AMS are generically referred to throughout the specification as a MS. The MS may access the wireless network through one or more devices or systems such as a relay station (RS), an advanced relay station (ARS), base station (BS), advanced base station (ABS), multi-hop relay base station (MRBS), access point (AP), node, node B, or enhanced node B (eNB). The terms BS, ABS, MRBS, AP, node, node B, or eNB are generically referred to throughout the specification as a BS. Further, the terms BS, ABS, MRBS, AP, node, node B, or eNB may be conceptually interchanged, depending on which wireless protocol is being used in a particular wireless network, so a reference to BS herein may also be considered a reference to either of eNB or AP as one example. Similarly, a reference to MS or SS herein may also be seen as a reference to either of UE or AMS as another example. Wireless networks specifically include, but are not limited to, wireless local area networks (WLANs), wireless personal area networks (WPANs), and/or wireless wide area networks (WWANs).

The following inventive embodiments may be used in a variety of applications including a processor, transceiver or transmitters and receivers of a radio system, although the present invention is not limited in this respect. In the field of communications, including wireless communications, it would be helpful to provide a system and methods for upgrading an airlink or air interface in a wireless network. Operators of networks update and upgrade their networks to accommodate new hardware, software, methods, and/or systems for communicating over the network, which may include a number of wired connections. Implementation of the upgraded systems in the network can require extensive resources and may affect service to users in the network. Application of new methods and systems for upgrading entities, such as hardware, software, methods, and/or systems within the network, that can reduce the amount of resources applied and disruption to the users while providing upgraded systems in the network would be desirable. Examples for upgrading an airlink or air interface in a wireless network are provided in various embodiments of the invention.

Figure 1:
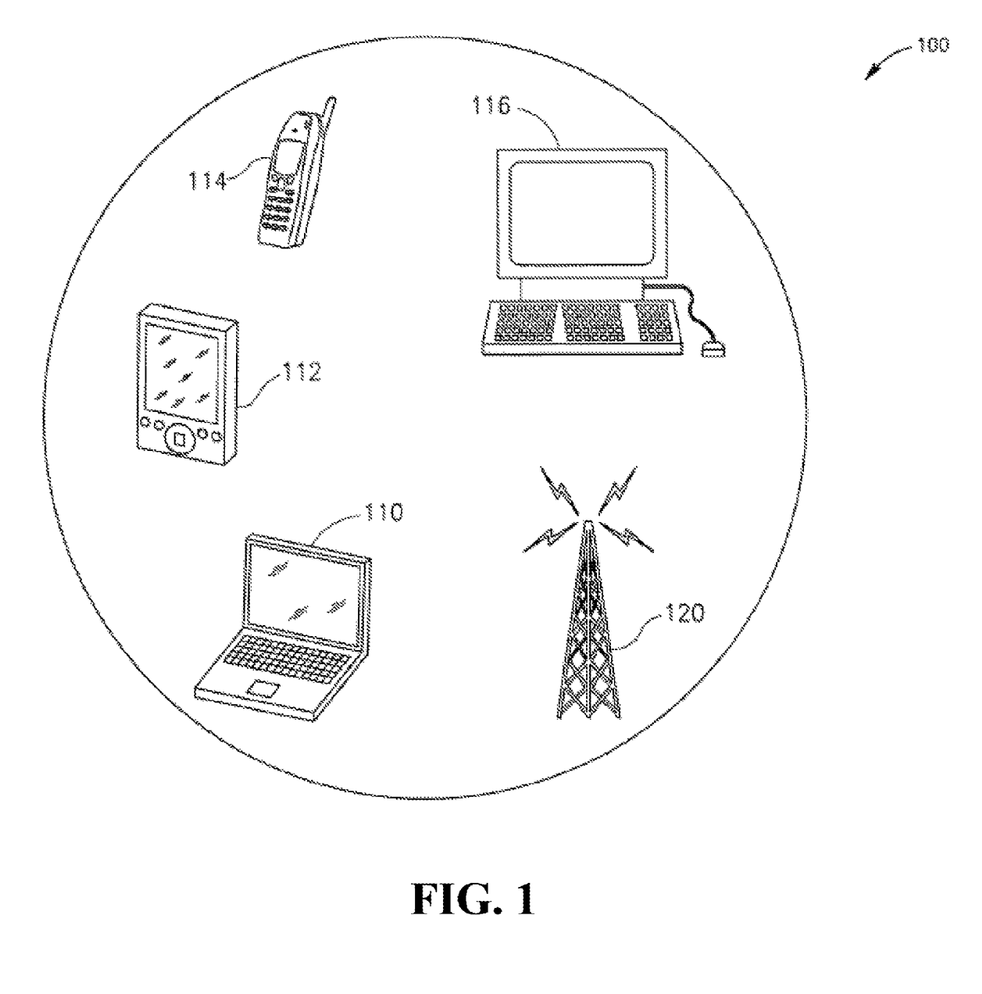
FIG. 1 is a block diagram that illustrates a wireless network according to some embodiments.

Reference is made to FIG. 1, which schematically illustrates a wireless network 100 to provide a telecommunications protocol that provides fixed and mobile internet access. Wireless network 100 may include one or more BS 120 to communicate with one or more MS 110, 112, 114, and/or 116 over a number of airlinks. Reference herein to the MS 110 may represent stations 110, 112, 114, and/or 116. The terms base station and mobile station are used merely as an example throughout this specification and their denotation in this respect is in no way intended to limit the inventive embodiments to any particular type of network or communication protocol. The MS 110, 112, 114, and/or 116 may be configured for communication over a single carrier or over a plurality of carriers, including a primary carrier and one or more secondary carriers. The base station 120 may also be configured for communication over one or a plurality of carriers, such as in a multiple-input multiple-output (MIMO) configuration.

Wireless network 100 may facilitate wireless access between each of MS 110, 112, 114, and/or 116 and BS 120. For example, wireless network 100 may be configured to use one or more protocols specified in by the Institute of Electrical and Electronics Engineers (IEEE) 802.11™ standards ("IEEE Standard for Wireless LAN Medium Access Control (MAC) and Physical Layer (PHY) Specification. 1999 Edition", reaffirmed Jun. 12, 2003), such as IEEE 802.11a™-1999; IEEE 802.11b™-1999/CorI2001; IEEE 802. IIg™-2003; and/or IEEE 802.11n™, in the IEEE 802.16™ standards ("IEEE Standard for Local and Metropolitan Area Networks—Part 16: Air Interface for Fixed Broadband Wireless Access System", Oct. 1, 2004), such as IEEE 802.162004/CorI-2005 or IEEE Std 802.16-2009, which may herein be referred to as the "IEEE Std 802.16-2009" or "WiMAX" standards, and/or in the IEEE 802.15.1™ standards ("IEEE Standard for Local and Metropolitan Area Networks—Specific Requirements. Part 15.1: Wireless Medium Access Control (MAC) and Physical Layer (PHY) Specifications for Wireless Personal Area Networks (WPANs™), Jun. 14, 2005), although the invention is not limited in this respect and other standards may be used. In some embodiments, attributes, compatibility, and/or functionality of wireless network 100 and components thereof may be defined according to, for example, the IEEE 802.16 standards (e.g., which may be referred to as a worldwide interoperability for microwave access (WiMAX)). Alternatively or in addition, wireless network 100 may use devices and/or protocols that may be compatible with a 3rd Generation Partnership Project (3GPP), Fourth Generation (4G), Long Term Evolution (LTE) cellular network or any protocols for WLANs or WWANs.

Embodiments of the invention may enable the next generation of mobile WiMAX systems (e.g., based on IEEE 802.16m, IEEE 802.16e, or IEEE 802.16ac standards) to efficiently support substantially high mobility and low latency applications, such as, for example, Voice-over-Internet Protocol (VoIP), interactive gaming over the air-interface, deployment in larger cell-sizes or lower frequency bands, and/or "multi-hop" relay operations.

In some embodiments, the BS 120 may manage and/or control wireless communications among MS 110, 112, 114, and/or 116 and between MS 110, 112, 114, and/or 116 and the BS 120. Mobile stations 110, 112, 114, and/or 116 may, in turn, facilitate various service connections of other devices (not shown) to wireless network 100 via a private or public local area network (LAN), although the embodiments are not limited in this respect.

Figure 2:
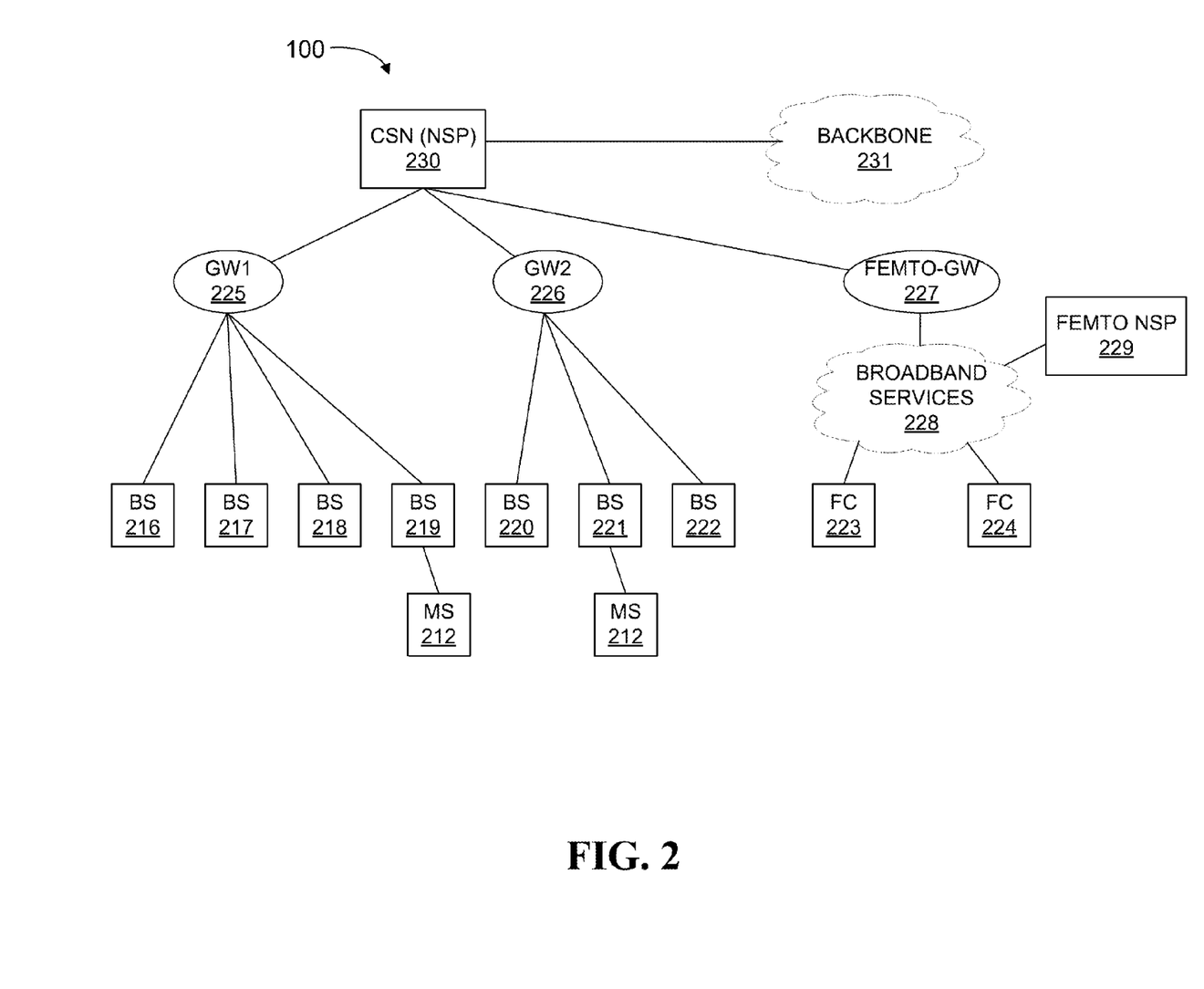
FIG. 2 is a schematic that illustrates a wireless network according to some embodiments.

FIG. 2 is an illustration of the wireless network 100 according to some embodiments. A number of BS 216-222 is provided in the wireless network 100 to provide connections for the MS 212-214. One or more RS (not shown) may also be used in the wireless network 100 to link BS(s) with MS(s). The BS 216-222 can take a variety of different forms and may cover large or small areas and transmit powers, depending on the application. In the illustrated example, the MS 212 is associated with the BS 219. This association allows the MS 212 to communicate with the BS 219 to support all of the services that the MS 212 and the system supports.

Each BS 216-222 is further connected to a gateway (GW) 225, 226. Each gateway supports a number of BS(s). The gateways may or may not be connected to each other and are all connected directly or indirectly to a Connectivity Service Network (CSN) for a Network Service Provider (NSP) 230. There may be one or more CSNs in any one system. The CSN is coupled to a telephony backbone 231 to provide access to other telephony systems, data servers and services. In some instances a BS may be connected directly to the CSN 230 through the backbone 231 instead of through a gateway.

A third gateway 227 is also connected to the other gateways and to the CSN 230. Femto-GW 227 is a femto gateway to support one or more femtocells (FC) 223, 224. The femtocells are coupled to the Femto-GW 227 through a secure tunnel through broadband services 228. In a typical example, each femtocell is located at a home or small business and is coupled through cable or DSL (Digital Subscriber Line) services to the Femto-GW 227. However, any other broadband service may be used including services of the NSP for the wireless network. In that case, the femtocell can connect through a BS 216-222.

In addition to the Femto-GW 227, the FC 223, 224 are also connected through a secure tunnel through the broadband services to a Femto NSP 229. The Femto NSP 229 provides services that are specific to femtocells.

In the illustrated example, system administration and management can be distributed between the BS, GW, Femto NSP 229, and NSP 230 in a variety of different ways. For communications, the MS 212 can communicate with the MS 214 through the respective connected BS and GW. If both MSs are registered at the same BS or femtocell, the BS may be able to support communications without routing through the GW. Similarly, if the MS 214 were connected to another system, NSP or ISP (Internet Service Provider), then the two MSs can communicate through the backbone 231. FIG. 2 shows one example network, however, the present invention can be applied to a wide range of different network configurations and communications can be routed differently to suit different situations and applications.

Figure 3:
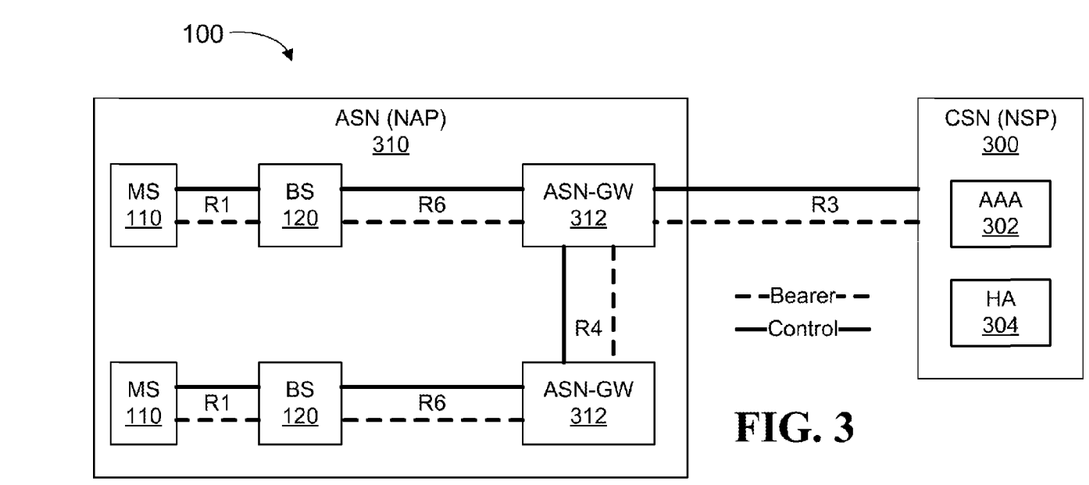
FIG. 3 is a diagram that illustrates a wireless network according to some embodiments.

FIG. 3 is a diagram illustrating an access service network gateway (ASN) network access provider (NAP) 310 and core services network (CSN) network services provider (NSP) 300 in a wireless network 100 according to some embodiments. The ASN-GW 312 serves as a gateway to the ASN network access provider (NAP) 310. The IEEE 802.16 standard describes medium-access-control (MAC) and physical layer (PHY) protocols for fixed and mobile broadband wireless-access systems and interfaces or airlinks described and illustrated in embodiments herein. The MAC and PHY functions can be classified into three categories, namely, a data plane, a control plane, and a management plane. The data plane comprises functions in a data processing path such as header compression, as well as MAC and PHY data packet-processing functions. A set of layer-2 (L2) control functions is required to support various radio resource configuration, coordination, signaling, and management. This set of functions is collectively referred to as the control-plane functions. A management plane is also defined for external management and system configuration.

The ASN 310 comprising the MS 110, BS 120, and ASN-GW 312 provide a relatively large coverage area for the MS 110 to access the ASN 310. Upon successful acquisition of system timing and cell identification with the BS 120, the MS 110 may attempt to detect and decode the system configuration information. This information is carried via the Superframe Headers (SFH). The superframe headers, comprising Primary and Secondary Superframe Headers (P-SFH and S-SFH), are control elements that are periodically broadcasted using a robust and reliable transmission format to ensure the information can be correctly detected by all MSs 120 in the coverage area of the BS 120. The correct and timely detection of the system information is essential for successful network entry/re-entry and handover. The S-SFH content is divided into three sub-packets (SP1, SP2, and SP3) where sub-packets carry essential information for various system processes such as initial network entry, network re-entry, Idle-State operation, etc. according to their respective timing sensitivity. The ASN 310 in this embodiment comprises a number of entities including two BS 120, two ASN-GW 312, and two MS 110, however additional or fewer entities may be provided in other embodiments.

The ASN-GW 312 are coupled to the connectivity services network/network services provider CSN (NSP) 300 through an R3 interface or connection. The R3 interface comprises a bearer connection, represented as a dashed line and a control connection represented as a solid line in FIG. 3, between the ASN-GW 312 and the CSN 300 to support AAA 302, policy enforcement and mobility management capabilities. The R3 interface also encompasses bearer plane methods (e.g., tunneling) to transfer IP data between the ASN and the CSN. The CSN 300 has an AAA (Authentication, Authorization and Accounting) server 302 and a home agent (HA) 304 for connecting to other wired or wireless networks.

The BS 120 connects to the ASN-GW 312 through a secure tunnel using an R6 interface. The secure tunnel can be through any type of broadband service, including wired and wireless services. The R6 interface between the BS 120 and the ASN-GW 312 in the ASN 310 consists of a set of control and bearer plane protocols for communication between the BS 120 and the ASN-GW 312. The bearer plane comprises intra-ASN data path or inter-ASN tunnels between the BS 120 and ASN-GW 312. The control plane includes protocols for IP tunnel management (establish, modify, and release) in accordance with the MS mobility events. The R6 interface may also serve as a conduit for exchange of MAC states information between neighboring BSs.

Each ASN-GW 312 in the ASN 310 couples to one another through an R4 interface. The R4 interface consists of a set of control and bearer plane protocols originating/terminating in various entities within the ASN 310 that coordinate MS 110 mobility between ASN 310. MS 110 interfaces with the BS 120 through an R1 interface per the air interface (PHY and MAC) specifications (IEEE P802.16). The R1 interface may include additional protocols related to the management plane.

Figure 4:
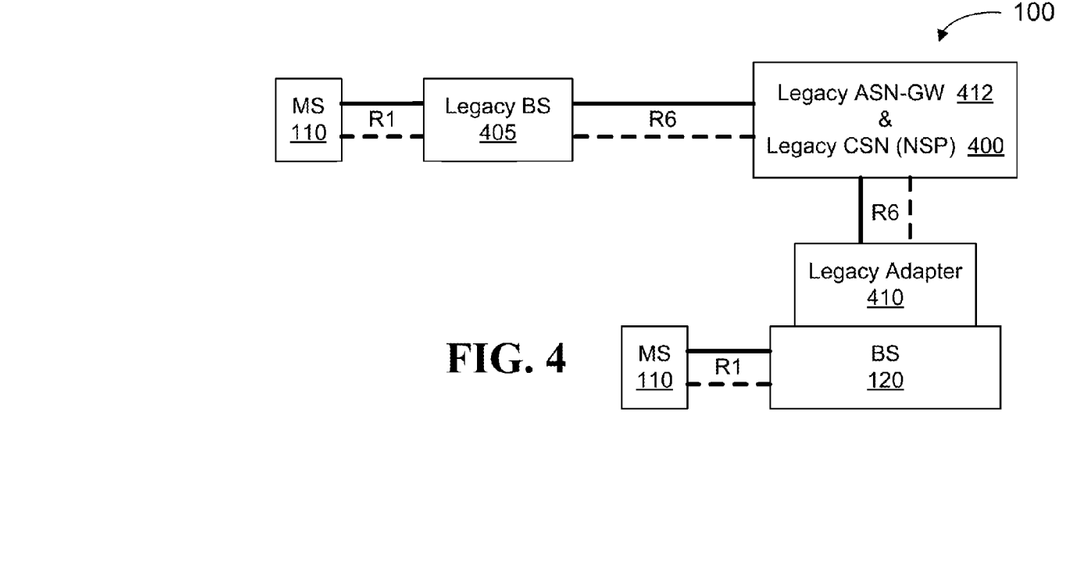
FIG. 4 is a diagram that illustrates an upgraded wireless network according to some embodiments.

FIG. 4 is a diagram illustrating an upgraded wireless network according to some embodiments. A network operator may deploy multiple networks, wherein each network is associated with a particular release of a wireless standard. For example, an operator may deploy a first wireless network according to WiMAX Release 1.0 (802.16e), a second wireless network according to WiMAX Release 1.5 (802.16e Rev. 2), and a third wireless network according to WiMAX Release 2.0 (802.16m). Further, the operator may choose to upgrade a network to change a version of a wireless standard (e.g. Release 1.0 to Release 1.5) or to change from a first wireless standard to a second wireless standard (e.g. 802.16e to 802.16m).

However, upgrading a wireless network typically involves modification or replacement of the ASN-GW 312 and BS 120, which is costly and can potentially disrupt service provided to users or subscribers. FIG. 4 illustrates an upgrade to a wireless network 100 including a BS 120 that is configured with a version of a wireless standard or a wireless standard that is different from legacy equipment in the wireless network 100. In this embodiment, the BS 120 is an upgraded BS 120 that is integrated with legacy equipment including a legacy ASN-GW 412, a legacy BS 405, and a legacy adapter 410. The legacy adaptor 410 may be a software stack or hardware entity to allow the BS 120 communicate with the legacy ASN-GW 412 using legacy signaling messages and to support legacy network functionality, including but not limited to (re-) authentication, and paging.

In an embodiment, the legacy adaptor 410 may be a software stack or hardware entity to allow the BS 120 communicate with the legacy ASN-GW 412 only using legacy signaling messages and only to support legacy network functionality.

When connected with the legacy ASN-GW 412, the BS 120 may incorporate PHY and MAC updates including upper MAC (UMAC) functionality that does not affect the ASN-GW 412 and a number of interfaces to the ASN-GW to allow a subset of upgrade functions realized on the air interface R1. A few examples of such upgrade functions that can be enabled even under legacy ASN-GW may include but are not limited to advanced MIMO, fast uplink access, multicarrier and enhanced ARQ.

Operators may upgrade to a different version of a wireless standard and/or a different wireless standard to provide flexibility by incorporating the BS 120 with upgraded functionality without changing existing network infrastructure or interfaces between entities within the wireless network 100, including the legacy ASN-GW 412 and the legacy BS 405 of FIG. 4. One benefit provided is the ability to plug the upgraded BS 120 into existing wireless networks 100 without changing existing entities in the wireless network 100. Additional or few entities such as the ASN-GW 412, the legacy BS 405 and/or the BS 120 may be included in other embodiments.

In an embodiment where the BS 120 is upgraded to 802.16m, the BS 120 needs the ability to communicate with the legacy ASN-GW 412 over the R6 interface in a backward compatible mode. The ability of the BS 120 to communicate with the ASN-GW 412 in a legacy network is particularly important for features that affect operation of the legacy ASN-GW 412 such as idle mode/paging, quality of service (QoS), MS 110 privacy, and a security framework. As one example, if the BS 120 is configured to communicate according to the IEEE 802.16m standard, the BS 120 communicates over the R6 interface with the legacy ASN-GW 412 according to a mobile WiMAX network working group (NWG) R1.5 standard. The BS 120 in this example needs to be aware that it is connected to the legacy ASN-GW 412. The BS 120 may be made aware of the legacy connection through the management plane, through a self-organizing network, or by statically configuring the BS 120 as being connected to the legacy network.

The BS 120 may advertise that it is connected to the legacy ASN-GW 412 via R6 interface on an R1 air interface so that MS 110 attached to the BS 120 knows that the MS 110 is aware of legacy entities in the wireless network 100. The BS 120 may advertise that it is connected to the legacy ASN-GW 412 by broadcasting a bit in a SFH, wherein the bit indicates that the BS 120 is connected to the legacy ASN-GW 412 and is configured in the network to accommodate legacy entities. Alternately, the bit in the SFH may indicate that the BS 120 is connected to an advanced ASN-GW (not shown). The BS 120 may also advertise that it is connected to the legacy ASN-GW 412 by applying a new MAC version number for BS 120 deployed in a wireless network 100 with legacy entities.

Figure 5:
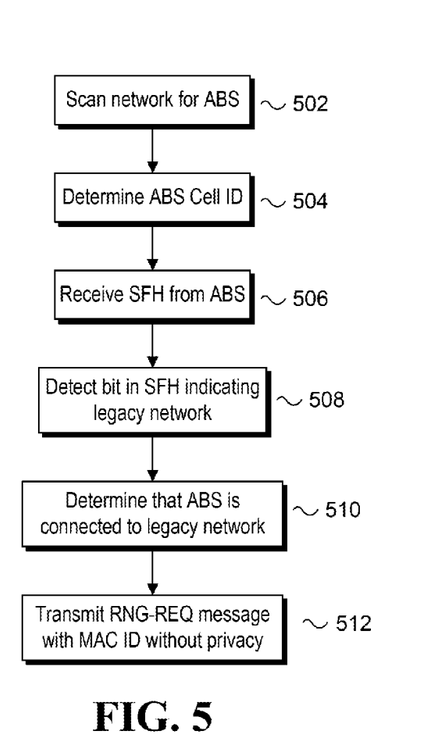
FIG. 5 is a diagram illustrating a method of initiating network entry in a legacy network according to some embodiments.

FIG. 5 is a diagram illustrating a method of initiating network entry in a legacy network according to some embodiments for upgrading an airlink or air interface in the wireless network 100. In element 502, a MS 110 such as an AMS scans for a BS 120 such as an ABS and detects the BS 120 in a wireless network 100, such as by receiving a beacon or another signal or message from the BS 120 in the wireless network 100. The MS 110 determines a cell identifier (ID) of the BS 120 in element 504 and receives a superframe header (SFH) from the BS 120 in element 506. The MS 110 detects a bit in the SFH in element 508, wherein the bit indicates whether the BS 120 is connected to a legacy access network. The bit may be a network configuration bit or similarly configured bit and the SFH may be a secondary SFH in this embodiment.

The MS 110 determines that the BS 120 is connected to the legacy network in element 510 and transmits a range request (RNG-REQ) message to the BS 120 in element 512 to indicate that the MS 110 is aware that the BS 120 is connected to the legacy access network. The MS 110 may also receive a station identifier (STID) from the BS 120, wherein the STID is the actual STID of the BS 120. The MS 110 may also transmit an actual media access control (MAC) ID to the BS 120 in the RNG-REQ message, knowing that legacy network does not support authentication with MS MAC ID privacy. The STID and the MAC ID in this embodiment represents true IDs of the respective hardware and not temporary IDs or otherwise randomly created IDs. Authentication and key exchange between the MS 110 and the BS 120 may be performed, wherein the MS 110 uses a privacy and key management protocol version 2 (PKMv2) security framework. Further, the BS 120 may use a new MAC version number wherein a MAC number for the BS 120 has been replaced to indicate that the BS 120 is connected to the legacy network. The MS 110 in this embodiment comprises a transceiver to transmit and receive signals by the MS 110 and a processor to execute elements of the methods described in reference to FIG. 5.

Figure 6:
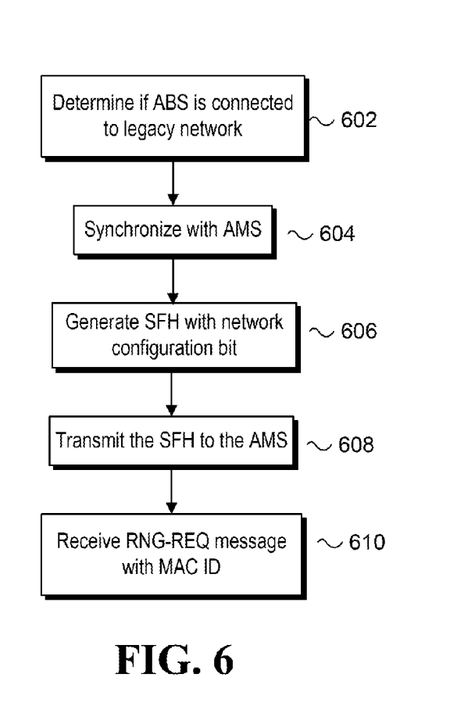
FIG. 6 is a diagram illustrating a method of initiating network entry in a legacy network according to some embodiments.

FIG. 6 is a diagram illustrating a method of initiating network entry in a legacy network according to some embodiments. In element 602, a BS 120 such as an ABS determines whether the BS 120 is connected to a legacy network. The BS 120 may determine that the BS 120 is connected to the legacy network if the BS 120 is statically configured to be connected to the legacy network, through a management plane, or through a self-organizing network. The BS 120 synchronizes with a MS 110 such as an AMS in element 604.

The BS 120 generates a SFH, which may be a primary or a secondary SFH, comprising a bit such as a network configuration bit or other indicator in element 606, wherein the bit indicates if the BS 120 is connected to a legacy access network. The BS 120 transmits the SFH to the MS 110 in element 608, wherein the SFH includes the bit. The BS 120 receives a range request (RNG-REQ) message in element 610, wherein the RNG-REQ message includes a real MAC ID of the MS 110 and a legacy access service network (ASN) bit to indicate that the MS 110 is aware that the BS 120 is connected to the legacy access network. The BS 120 may also transmit a MAC version number to the MS 110, with or without the network configuration bit, to indicate whether the BS 120 is connected to the legacy access network. Further, the BS 120 may use privacy and key management protocol version 2 (PKMv2) during initial network entry. The BS 120 may also transmit a range response (RNG-RSP) message to the MS 110, wherein the RNG-RSP message comprises an actual station ID (STID) of the BS 120. Further, the BS 120 may perform handoff (HO) by setting an ASN bit in a handoff-command (HO-CMD) message to indicate if a target base station (TBS) is connected to the legacy network.

In another embodiment, a RNG-RSP message may be used to assign a temporary STID to the MS 110 and later assign the actual STID such as in an encrypted message after authentication, so that some level of privacy is provided. This optimization may work with legacy network and can be controlled by BS 120.

The operation discussed herein may be generally facilitated via execution of appropriate firmware or software embodied as code instructions on tangible media as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within embodiments of the invention.

What is claimed is:

1. A method to initiate wireless communication by an advanced mobile station (AMS), comprising:
    scanning for an advanced base station (ABS) in a network;
    detecting an ABS comprising an Institute of Electrical and Electronics Engineers (IEEE) 802.16m base station in the network;
    receiving a superframe header (SFH) from the ABS;
    detecting a bit in the SFH, wherein the bit indicates if the ABS is connected to an IEEE 802.16e access service network gateway (ASN-GW);
    determining that the ABS is connected to the IEEE 802.16e ASN-GW; and
    transmitting an advance air interface range request (AAI RNG-REQ) message to the ABS to indicate that the AMS is aware the ABS is connected to the IEEE 802.16e ASN-GW.

2. The method of claim 1, further comprising receiving a station identifier (STID) from the ABS, wherein the STID is the actual STID of the ABS.

3. The method of claim 1, further comprising transmitting an actual media access control (MAC) ID to the ABS in the AAI RNG-REQ message.

4. The method of claim 3, wherein the ABS uses a new MAC version number instead of the bit in the SFH to indicate that the ABS is connected to the IEEE 802.16e ASN-GW.

5. The method of claim 1, further comprising performing authentication and key exchange with the ABS, wherein the AMS uses a privacy and key management protocol version 2 (PKMv2) security framework.

6. The method of claim 1, wherein the bit is a network configuration bit and the SFH is a secondary SFH.

7. A method to initiate network entry by an advanced base station (ABS), comprising:
    determining if the ABS is connected to an Institute of Electrical and Electronics Engineers (IEEE) 802.16e access service network gateway (ASN-GW);
    synchronizing with an advanced mobile station (AMS);

generating a superframe header (SFH) with a network configuration bit, wherein the network configuration bit indicates if the ABS is connected to the IEEE 802.16e ASN-GW;

transmitting the SFH to the AMS; and receiving an advance air interface range request (AAI RNG-REQ) message, wherein the AAI RNG-REQ message includes a real MAC identifier (ID) of the AMS and a legacy access service network (ASN) bit to indicate that the AMS is aware the ABS is connected to the IEEE 802.16e ASN-GW.

8. The method of claim 7, wherein the ABS is aware that the ABS is connected to the IEEE 802.16e ASN-GW through a management plane, through a self-organizing network, or by a statically configured ABS.

9. The method of claim 7, further comprising transmitting a media access control (MAC) version number to the AMS.

10. The method of claim 7, further comprising using privacy and key management protocol version 2 (PKMv2) during initial network entry.

11. The method of claim 7, further comprising performing handoff (HO) by setting an ASN bit in a HO-CMD message to indicate if a target base station (TBS) is connected to the IEEE 802.16e ASN-GW.

12. The method of claim 7, wherein the SFH is a secondary SFH.

13. The method of claim 7, further comprising transmitting an advance air interface range response (AAI RNG-RSP) message to the AMS, wherein the AAI RNG-RSP message comprises an actual station ID (STID) assignment from the ABS.

14. The method of claim 7, further comprising transmitting an advance air interface range response (AAI RNG-RSP) message to the AMS, wherein the AAI RNG-RSP message comprises an temporary station ID (STID) assignment from the ABS.

15. An advanced mobile station (AMS), comprising:

a transceiver configured to scan a network for an advanced base station (ABS), to detect an ABS comprising an Institute of Electrical and Electronics Engineers (IEEE) 802.16m base station in the network, to receive a superframe header (SFH) from the ABS, and to transmit an advance air interface range request (AAI RNG-REQ) message to the ABS to indicate that the AMS is aware the ABS is connected to an IEEE 802.16e access service network gateway (ASN-GW); and a processor configured to detect a bit in the SFH, wherein the bit indicates if the ABS is connected to IEEE 802.16e ASN-GW.

16. The AMS of claim 15, wherein the transceiver is configured to receive a station identifier (STID) from the ABS, wherein the STID is an actual STID assignment from the ABS.

17. The AMS of claim 15, wherein the transceiver is configured to receive a station identifier (STID) from the ABS, wherein the STID is a temporary STID assignment from the ABS.

18. The AMS of claim 15, wherein the transceiver is configured to transmit an actual media access control (MAC) ID to the ABS in the (AAI RNG-REQ) message.

19. The AMS of claim 15, wherein the transceiver is configured to perform authentication and key exchange with the ABS, wherein the AMS uses a privacy and key management protocol version 2 (PKMv2) security framework.

20. The AMS of claim 15, wherein the bit is a network configuration bit and the SFH is a secondary SFH.

\* \* \* \* \*

UNITED STATES PATENT AND TRADEMARK OFFICE
CERTIFICATE OF CORRECTION

PATENT NO. : 8,483,132 B2
APPLICATION NO. : 12/890179
DATED : July 9, 2013
INVENTOR(S) : Muthaiah Venkatachalam et al.

It is certified that error appears in the above-identified patent and that said Letters Patent is hereby corrected as shown below:

In the Claims:

In column 8, line 45, in claim 1, after "aware" insert -- that --.

In column 9, line 10, in claim 7, after "aware" insert -- that --.

In column 10, line 11, in claim 15, after "aware" insert -- that --.

Signed and Sealed this
Tenth Day of September, 2013

Teresa Stanek Rea
*Acting Director of the United States Patent and Trademark Office*